(12) United States Patent
Kappelmüller

(10) Patent No.: US 6,779,997 B2
(45) Date of Patent: Aug. 24, 2004

(54) INJECTION MOULDING APPARATUS WITH A LUBRICANT PUMP

(75) Inventor: Werner Kappelmüller, Schwertberg (AT)

(73) Assignee: Engel Maschinenbau Gesellschaft m.b.H, Schwertberg (AT)

(*) Notice: Subject to any disclaimer, the term of this patent is extended or adjusted under 35 U.S.C. 154(b) by 0 days.

(21) Appl. No.: 10/270,907

(22) Filed: Oct. 15, 2002

(65) Prior Publication Data

US 2003/0075299 A1 Apr. 24, 2003

(30) Foreign Application Priority Data

Oct. 19, 2001 (AT) .......................................... 814/2001 U

(51) Int. Cl.[7] .............................................. B29C 45/83
(52) U.S. Cl. ...................................... 425/107; 425/161
(58) Field of Search ................................ 425/161, 107, 425/589

(56) References Cited

U.S. PATENT DOCUMENTS

| 4,290,701 A | | 9/1981 | Schad |
| 5,217,662 A | * | 6/1993 | Yamamura et al. ......... 425/107 |
| 5,297,953 A | | 3/1994 | Wang |

FOREIGN PATENT DOCUMENTS

| JP | 3216255 | 9/1991 |
| JP | 9220751 | 8/1997 |

* cited by examiner

*Primary Examiner*—Tim Heitbrink
(74) *Attorney, Agent, or Firm*—Notaro & Michalos PC

(57) ABSTRACT

An injection moulding apparatus with mould mounting plates carrying mould tools and a lubricant pump supplying a plurality of consumers and at least one machine part movable by a hydraulic drive, wherein the energy supply of the hydraulic drive (10) is effected by the lubricant pump (20).

6 Claims, 5 Drawing Sheets

INJECTION MOULDING APPARATUS WITH A LUBRICANT PUMP

FIELD AND BACKGROUND OF THE INVENTION

The invention relates to an injection moulding apparatus with mould mounting plates carrying mould tools and a lubricant pump supplying a plurality of locations and at least one machine part movable by a hydraulic drive.

The invention relates to an injection moulding apparatus with mould mounting plates carrying mould tools and a lubricant pump supplying a plurality of locations and at least one machine part movable by a hydraulic drive.

In conventional injection moulding machines a central hydraulic pump is driven by an electric motor. The pressure fluid actuates piston-cylinder units for closing the mould, for maintaining a closure pressure, for opening the mould and for injecting the plasticised plastic material. It is only the plasticisation of the plastic material that is effected by a rotary movement, namely the rotary movement of the plasticising screw which is produced by a hydraulic motor driven by the hydraulic fluid.

Hydraulic drives seem to be the ideal drive technology for injection moulding machines if it is considered that in this case it is almost exclusively linear movements of a defined length that are executed, at the end of which typically a constant pressure (closing pressure, contact pressing pressure, holding pressure) is to be maintained. Nonetheless, fully electric injection moulding machines have become widespread over the last two decades, in regard to which it is not sufficient for the injection procedure to be implemented by a servomotor which can be well controlled. With regard to the avoidance of energy losses but in particular also contamination and disposal problems when connecting all moving parts of the machine to the central hydraulic pump, the described linear drives are implemented by three-phase motors, the rotary movement of which is converted into a linear movement again by spindles or the like.

If in accordance with those lines of argument the provision of a hydraulic motor in the injection moulding apparatus is relinquished, it is necessary at the present time to come to terms with the fact that an electric motor in itself is rather unsuitable for many tasks. That applies in particular where the drive produces a slight movement only after long intervals of time and moreover is to hold a high pressure.

SUMMARY OF THE INVENTION

The invention now starts out in terms of the consideration that even a so-called fully electrical machine cannot forego the lubrication of various bearing locations and for that purpose has a central lubricant pump from which lines lead to the individual bearing locations. This means that a system is available in such machines, which system provides a fluid under high pressure at any time. The invention provides that this system for energy supply is associated with a hydraulic drive of the injection moulding machine, in particular the fixing device for the mould tools.

In carrying out the concept of the invention it is in itself possible to operate the hydraulic drive, for example that of the clamping device for the mould tools, directly with the lubricant. As the experience in that respect is still slight, it is also possible to associate with the hydraulic drive its own fluid circuit which is put under pressure by way of the lubricant pump. In that way, the principle of the installation which is completely free from hydraulic fluid is admittedly mitigated somewhat, but the essential advantage of the fully electrical machine, namely foregoing its own hydraulic pump together with the associated lines and conduits, is maintained.

Details of the invention are described hereinafter by means of embodiments.

DESCRIPTION OF THE PREFERRED EMBODIMENTS

Hereinafter only one respective clamping bolt 6 and the associated parts of a mould tool 3 and a mould mounting plate 1 are described, it will be appreciated that the other clamping bolts 6 and the associated arresting devices on the same and on the opposite mould tool 3 and mould mounting plate 1 are of a similar configuration.

The other parts of the injection moulding machine such as for example injection nozzles, plastic material feed and closing mechanism will not be discussed in detail in the context of the description hereinafter.

Figure 1:
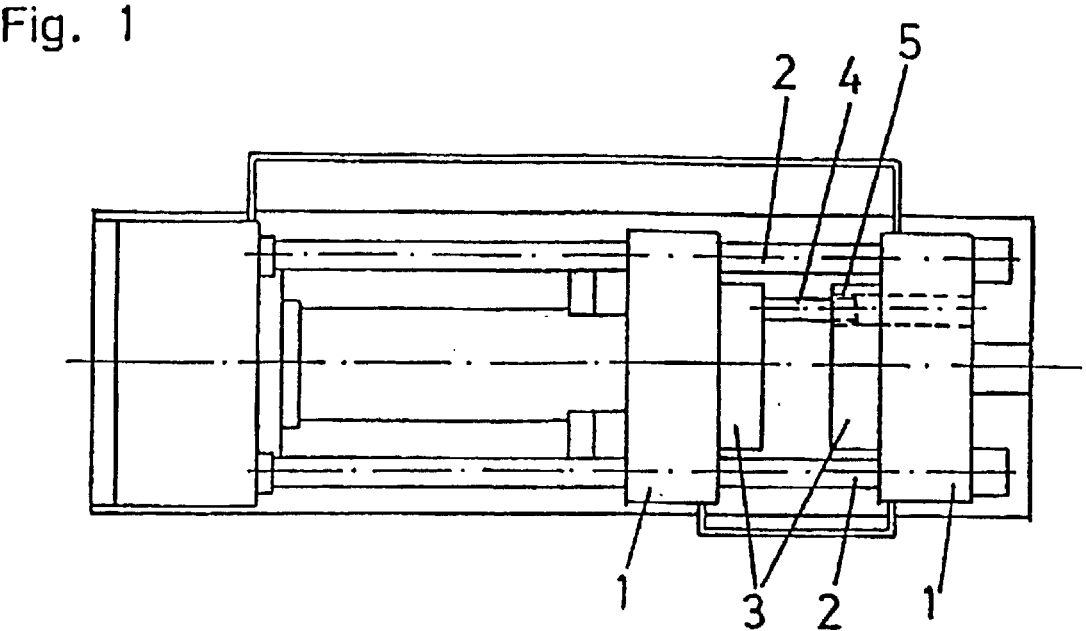
FIG. 1 diagrammatically shows a plan view of an injection moulding machine with a fixing device for mould tools.

In the injection moulding machine shown in FIG. 1 the mould mounting plates 1 are arranged in conventional manner on bars 2.

The two mould mounting plates 1 carry mould tools 3. One mould tool 3 is provided with a guide pin 4 which projects into a guide bore 5 in the other mould tool 3. The guide pin 4 and the guide bore 5 provide for centering of the mould tools 3 in the closing plane and are therefore designed with a high degree of accuracy.

Each mould tool 3 is provided at its rear side with four clamping bolts 6. The clamping bolts 6 project into corresponding holes 7 which in the embodiment illustrated are in the form of blind holes in the mould mounting plates 1.

The clamping bolts 6 have radial holes 8 passing therethrough, the wall of which forms an inclined surface 8' at the side remote from the mould tool 3.

Mounted in the mould mounting plates 1 laterally of the holes 7 and in parallel relationship with the mould separation plane are wedge-shaped sliders 9 of the arresting device which are disposed in openings 17 in the mould mounting plates 1. The openings 17 are open at the sides of the mould mounting plates 1. The wedge-shaped sliders are acted upon by drives 10 which are in the form of piston-cylinder units and, when the mould tools 3 are mounted, latch into the holes 8 in the clamping bolts 6.

It is now to be noted that the sliders 9 are in the closed position, that is to say in the holes 8 in the clamping bolts 6, throughout the entire operation of the injection moulding machine, and are constantly under pressure from the hydraulic side, that is to say the piston of the hydraulic cylinder unit 10 is constantly under pressure and therefore presses against the associated slider 9 of the arresting device.

Figure 2:
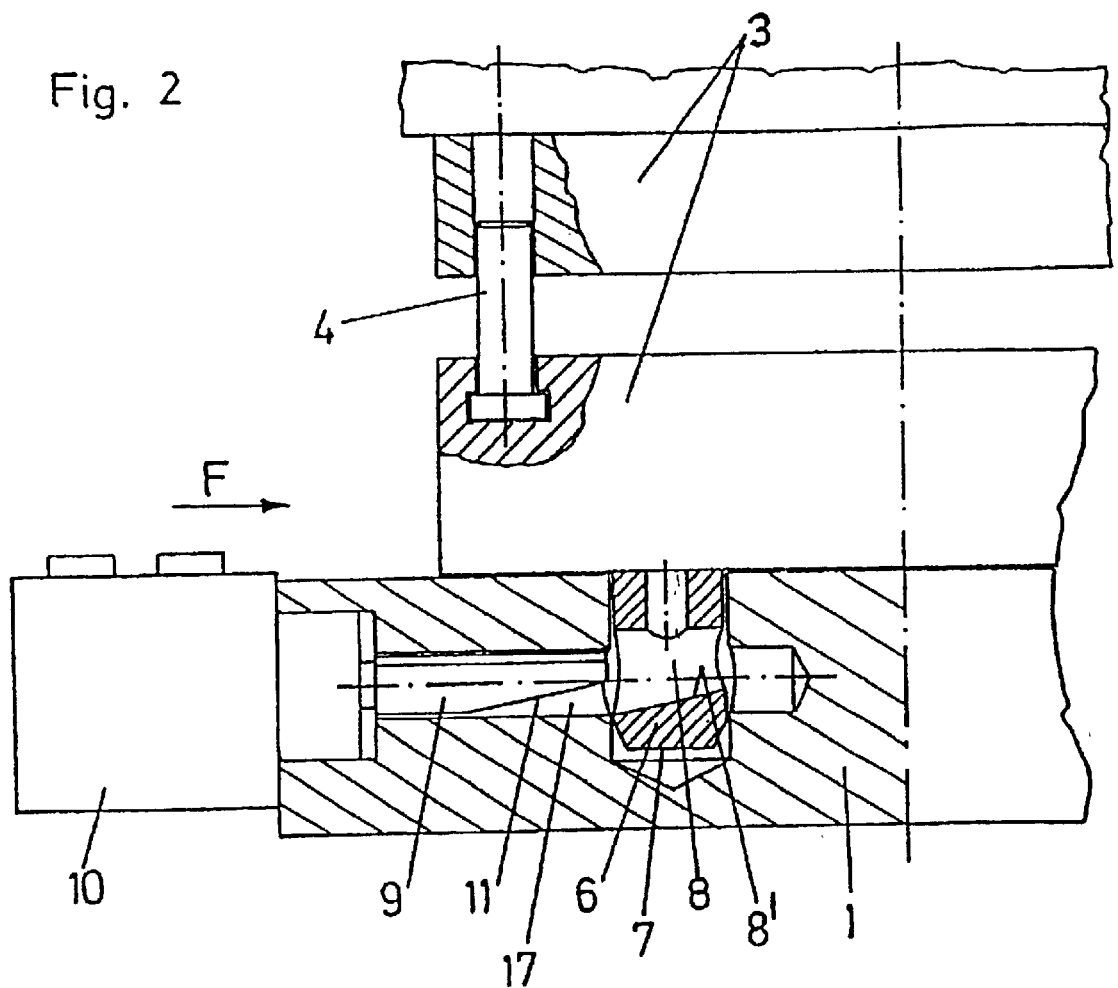
FIG. 2 shows a section through half of a mould mounting plate and a mould tool with a fixing device at one side of the injection moulding machine, and FIGS. 3 to 5 describe three various possibilities of operating the apparatus shown in FIGS. 1 to 3 by means of the lubricant pump of the system.
Figure 3:
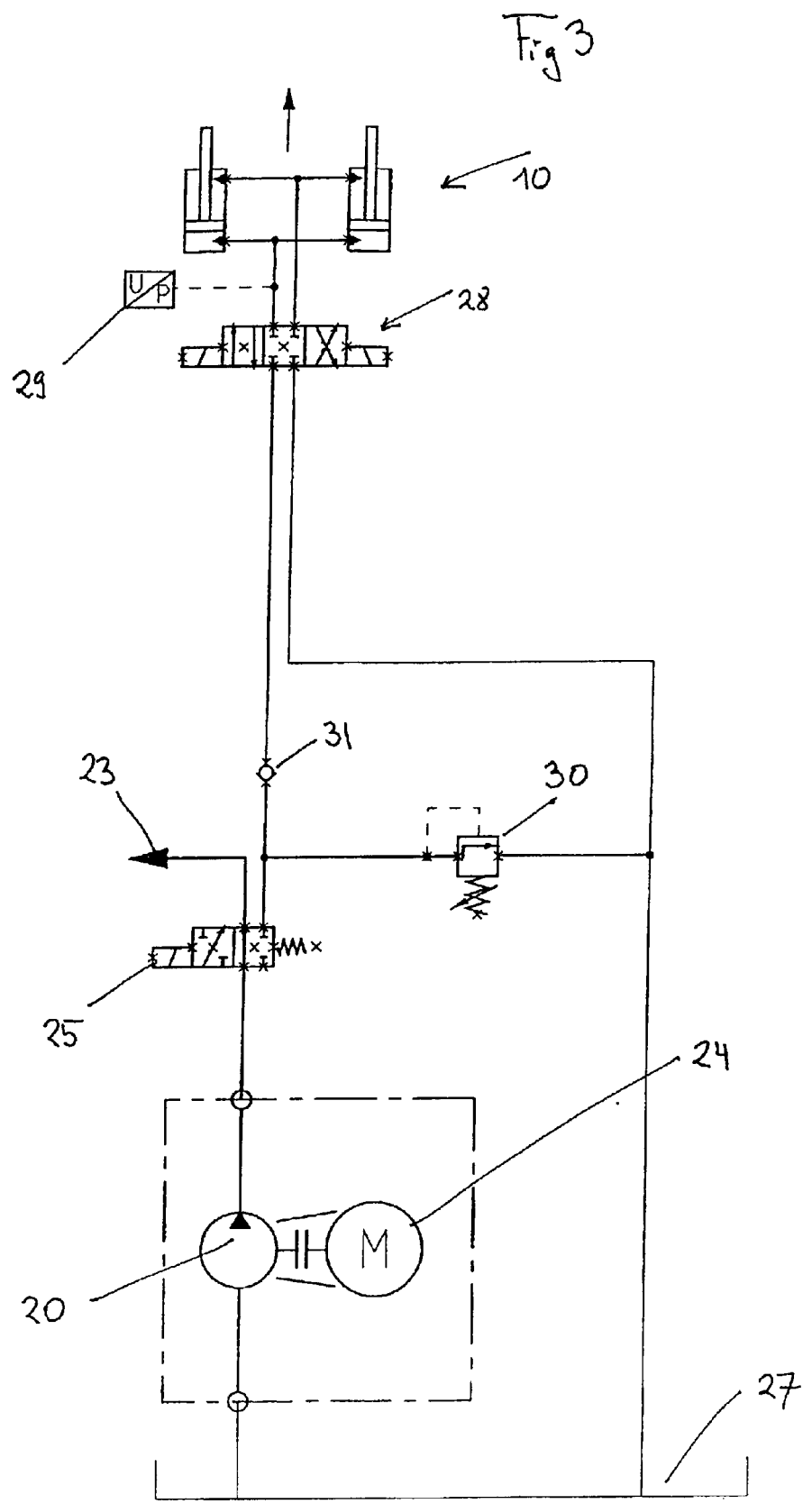
Figure 4:
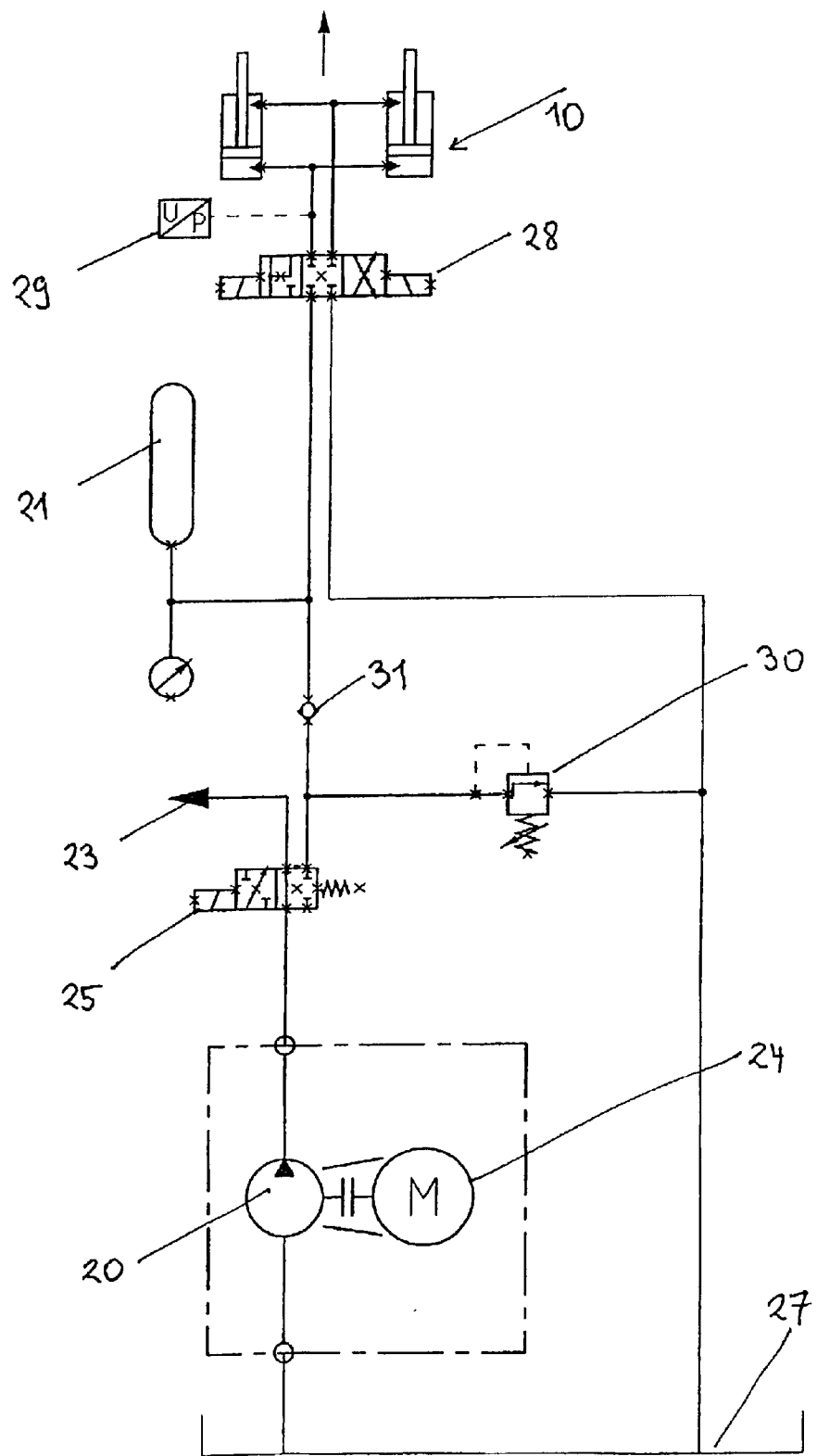
Figure 5:
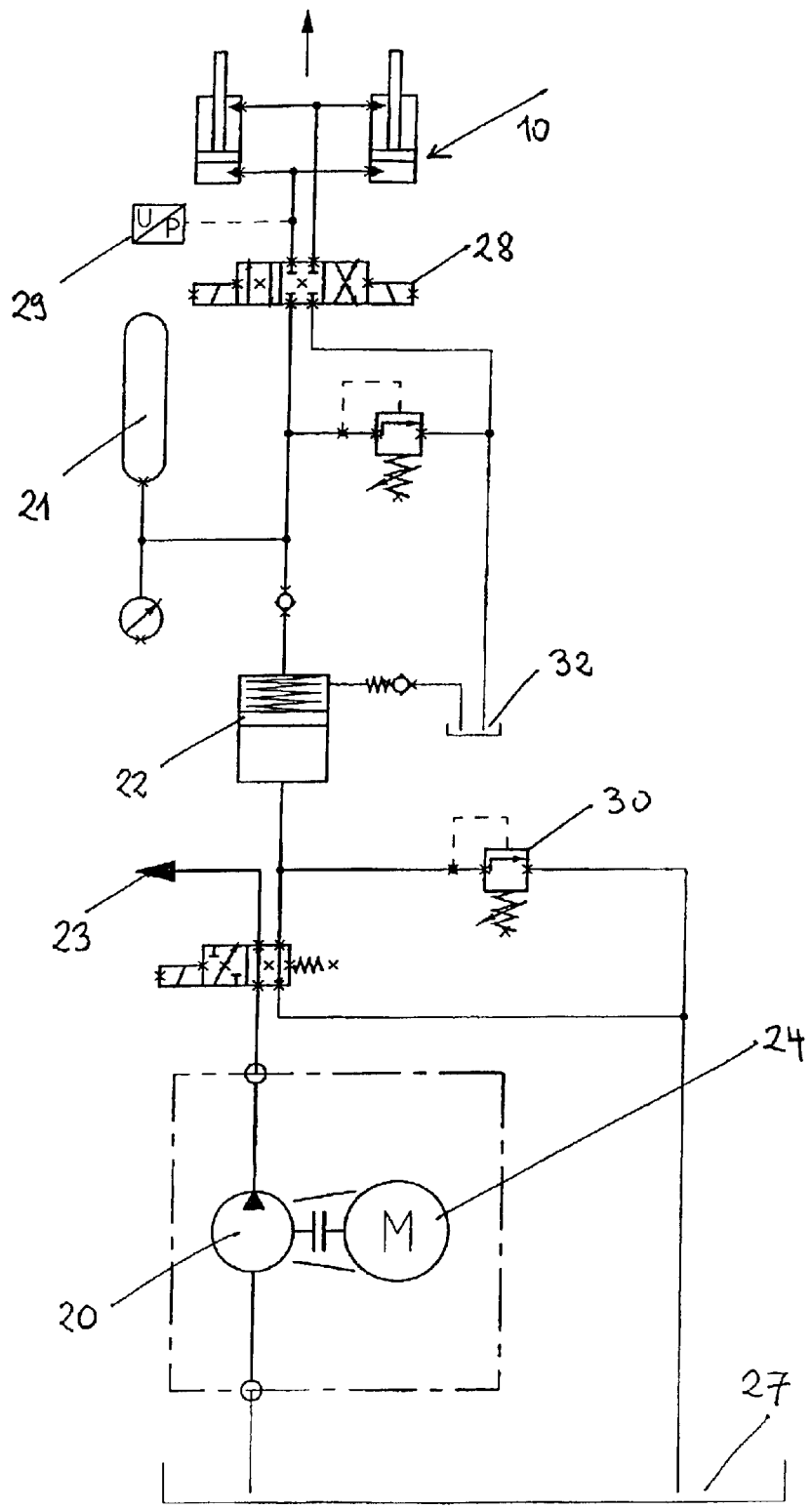

FIGS. 3 to 5 show three different ways of actuating and controlling the hydraulic drive 10 in FIG. 2.

What is common to all embodiments is the use of a lubricant pump 20 which is intermittently driven by a motor 24 and supplies lubricant to lubricant locations within the apparatus. In the normal position of the valve 25, as shown in the drawings, the pump serves to supply lubricant locations 23 with lubricant from the tank 27.

By actuation of the valve 25 in FIG. 3, the flow of lubricant can be passed by way of the check valve 31 to the hydraulic drive 10, at a pressure which is limited by the pressure relief valve 30. In this respect the direction of movement of the drive is determined by the control slider 28 and the pressure in the cylinders of the drive 10 is monitored by the pressure detector 29.

The embodiment of FIG. 4 differs from that shown in FIG. 3 in particular by the arrangement of the pressure storage device 21 which makes it possible to bring the motor 24 to a halt while the sole function of the drive 10 is to hold a minimum pressure. In addition the control slider 28 is so designed that it forms a differential circuit and thus permits a fast piston movement.

While in the embodiments of FIGS. 3 and 4 the lubricant actuates the drive 10, in the embodiment of FIG. 5 the drive 10 is provided with its own hydraulic circuit which includes the tank 32. The supply to that circuit by a central hydraulic pump can in turn be avoided by the lubricant pump 20 displacing the piston 22 against the pressure of a return spring and charging up the pressure storage device 21 of the hydraulic fluid.

What is claimed is:

1. An injection moulding apparatus comprising mould mounting plates carrying mould tools, said apparatus further comprising a lubricant pump supplying lubricant to lubricant locations within the apparatus, the lubricant pump also supplying lubricant to a hydraulic drive, the hydraulic drive being connected to a machine part of the injection moulding apparatus.

2. An injection moulding apparatus according to claim 1, wherein the lubricant directly actuates the hydraulic drive.

3. An injection moulding apparatus according to claim 1, including a pressure storage device connected between the lubricant pump and the hydraulic drive.

4. An injection moulding apparatus according to claim 1, wherein the machine part is movable to clamp one of the mould tools to one of the mould plates.

5. An injection moulding apparatus comprising mould mounting plates carrying mould tools, said apparatus further comprising a lubricant pump supplying lubricant to lubricant locations within the apparatus, a hydraulic drive for a machine part, the hydraulic drive being in a separate hydraulic circuit from the lubricant pump, and a piston for supplying pressure to the separate hydraulic circuit for actuating the hydraulic drive, the lubricant pump supplying lubricant to the piston for actuating the piston to supply pressure to the separate hydraulic circuit to actuate the hydraulic drive and move the machine part.

6. An injection moulding apparatus according to claim 5, wherein the machine part is movable to clamp one of the mould tools to one of the mould plates.

* * * * *